United States Patent
Bly et al.

(10) Patent No.: US 8,094,559 B1
(45) Date of Patent: Jan. 10, 2012

(54) CONSUMPTION OF A PERMITTED DATA RATE BY GROUPED DATA STREAMS

(75) Inventors: Keith Michael Bly, Newman Lake, WA (US); Kelly Donald Fromm, Newman Lake, WA (US)

(73) Assignee: World Wide Packets, Inc., Spokane Valley, WA (US)

(*) Notice: Subject to any disclaimer, the term of this patent is extended or adjusted under 35 U.S.C. 154(b) by 1624 days.

(21) Appl. No.: 11/421,392

(22) Filed: May 31, 2006

(51) Int. Cl.
  *H04L 12/56* (2006.01)
  *H04J 3/22* (2006.01)
(52) U.S. Cl. .................................. 370/235; 370/465
(58) Field of Classification Search .................. None
  See application file for complete search history.

(56) References Cited

U.S. PATENT DOCUMENTS

| | | | |
|---|---|---|---|
| 2003/0117945 A1* | 6/2003 | Zboril | 370/216 |
| 2004/0001592 A1* | 1/2004 | Akiwumi-Assani et al. | 380/271 |
| 2004/0101302 A1* | 5/2004 | Kim et al. | 398/45 |
| 2005/0036556 A1* | 2/2005 | Balakrishnan et al. | 375/240.26 |
| 2007/0047578 A1* | 3/2007 | Abe et al. | 370/468 |
| 2008/0291882 A1* | 11/2008 | Martinotti et al. | 370/338 |

OTHER PUBLICATIONS

Heinanen, Finland and Guerin, "A Single Rate Three Color Marker", Network Working Group, University of Pennsylvania, Sep. 1999, 6 Pages.
Heinanen, Finland and Guerin, "A Two Rate Three Color Marker", Network Working Group, University of Pennsylvania, Sep. 1999, 5 Pages.

* cited by examiner

*Primary Examiner* — Andrew Lee
(74) *Attorney, Agent, or Firm* — Clements Bernard PLLC; Christopher L. Bernard; Lawrence A. Baratta, Jr.

(57) ABSTRACT

This document describes tools that enable data network equipment to use its permitted data rate or physical maximum rate even if one of its links fail or it transmits more data on some links than others. To do so, the tools may track how much of a permitted data rate is used by a group of physical links. If the group is using more than the permitted data rate, the tools may limit the group to that rate. If some of the physical links in the group fail, the tools enable the group to use either its permitted data rate or the physical maximum rate of the group. In addition, the tools allow unique permitted data rates in two directions by a group of physical links. The tools may be used at ingress or egress modules within equipment depending upon the application and implementation.

17 Claims, 5 Drawing Sheets

CONSUMPTION OF A PERMITTED DATA RATE BY GROUPED DATA STREAMS

BACKGROUND

Data network services often utilize multiple data links. An Internet service provider, for example, may connect a subscriber to the Internet using multiple optical fibers where each of the fibers relays information between the provider and the subscriber.

In some cases, providers use multiple data links so that if a link fails, such as because a road construction crew severs one of the fibers connecting the provider and the subscriber, the subscriber will still have access to the data network. If only one link connected the subscriber to the provider and it was cut, the subscriber would lose access.

In some other cases, providers use multiple data links because one link is too slow to provide a subscriber's desired communication rate. A 100-megabit-per-second (Mbps) Ethernet link, for example, can transmit and receive data at a rate of up to, but not greater than, 100 Mbps. If a subscriber requires more than 100 Mbps, the provider may provision a second link. These two links—while separate physically—can be grouped. This group then has a physical maximum data rate of 200 Mbps (100 Mbps plus 100 Mbps).

The group of links may also have a permitted data rate, which is often based on the subscriber's needs or the provider's capabilities. This permitted data rate for the group (and thus the subscriber) may be less than the group's physical maximum data rate. For example, a provider may create a group having two 100 Mbps links with a physical maximum rate of 200 Mbps and assign a permitted data rate of 150 Mbps to the group. Often the service provider's equipment (e.g., switch or router) enforces the permitted data rate assigned to a group. This equipment may reject data packets sourced at a rate in excess of the permitted data rate.

Currently, this equipment often enforces this permitted data rate by allocating a maximum rate for each physical link belonging to the group. The equipment sets this per-link maximum rate as the subscriber's permitted data rate divided by the number of active physical links in the subscriber's group. For example, if a group has two 100 Mbps physical links, and the permitted data rate assigned to the group is 150 Mbps, the equipment at one end permits the remote equipment to transmit data packets on each of the two physical links at a rate of no more than 75 Mbps. Thus, if the remote equipment transmits data on either of the two physical links at a rate in excess of 75 Mbps, the local equipment may drop a subset of the data packets received on that link.

If one of the links in the group fails or the remote equipment transmits more than the per-link maximum rate on one link but less than the per-link maximum rate on another, the local equipment may prevent the remote equipment from using as much of the permitted rate as possible. If one of the two 100 Mbps links of the above-mentioned group fails, the subscriber will only be able to transmit data at 75 Mbps. If the remote equipment attempts to transmit 90 Mbps on the only available physical link of the group, the local equipment may drop 15 Mbps because that physical link has exceeded its allocated 75 Mbps per-link maximum rate. This 15 Mbps is dropped despite the fact that the remote equipment has not exceeded its permitted data rate of 150 Mbps and the group of links still has a physical maximum data rate of 100 Mbps.

Or, if neither of the physical links fails but the remote equipment attempts to transmit 100 Mbps on one link and only 50 Mbps on the other, the local equipment may only permit the subscriber to transmit data at 125 Mbps. In this case the local equipment drops 25 Mbps of the data packets received on a first physical link for exceeding the physical link's allocated portion —75 Mbps—even though the subscriber has not exceeded its permitted data rate of 150 Mbps.

SUMMARY

This document describes tools that enable data network equipment to use its permitted data rate or physical maximum rate even if one of its links fails or it transmits more data on some links than others. To do so, the tools may track how much of a permitted data rate is used by a group of physical links. If the group is using more than the permitted data rate, the tools may limit the group to that rate. If some of the physical links in the group fail, the tools enable the group to use either its permitted data rate or the physical maximum rate of the group. In addition, the tools allow unique permitted data rates in two directions by a group of physical links. The tools may be used at ingress or egress modules within equipment depending upon the application and implementation.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of enabling equipment to use its permitted data rate or physical maximum rate even if one of its links fails or it transmits more data on some links than others. An environment in which the tools may enable these and other actions is set forth below in a section entitled Exemplary Operating Environment. This is followed by another section describing exemplary ways in which the tools may act to permit a plurality of data streams to consume a permitted data rate using a token scheme and is entitled Exemplary Embodiments for Consuming a Permitted Data Rate Using a Token Scheme. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

Figure 1:
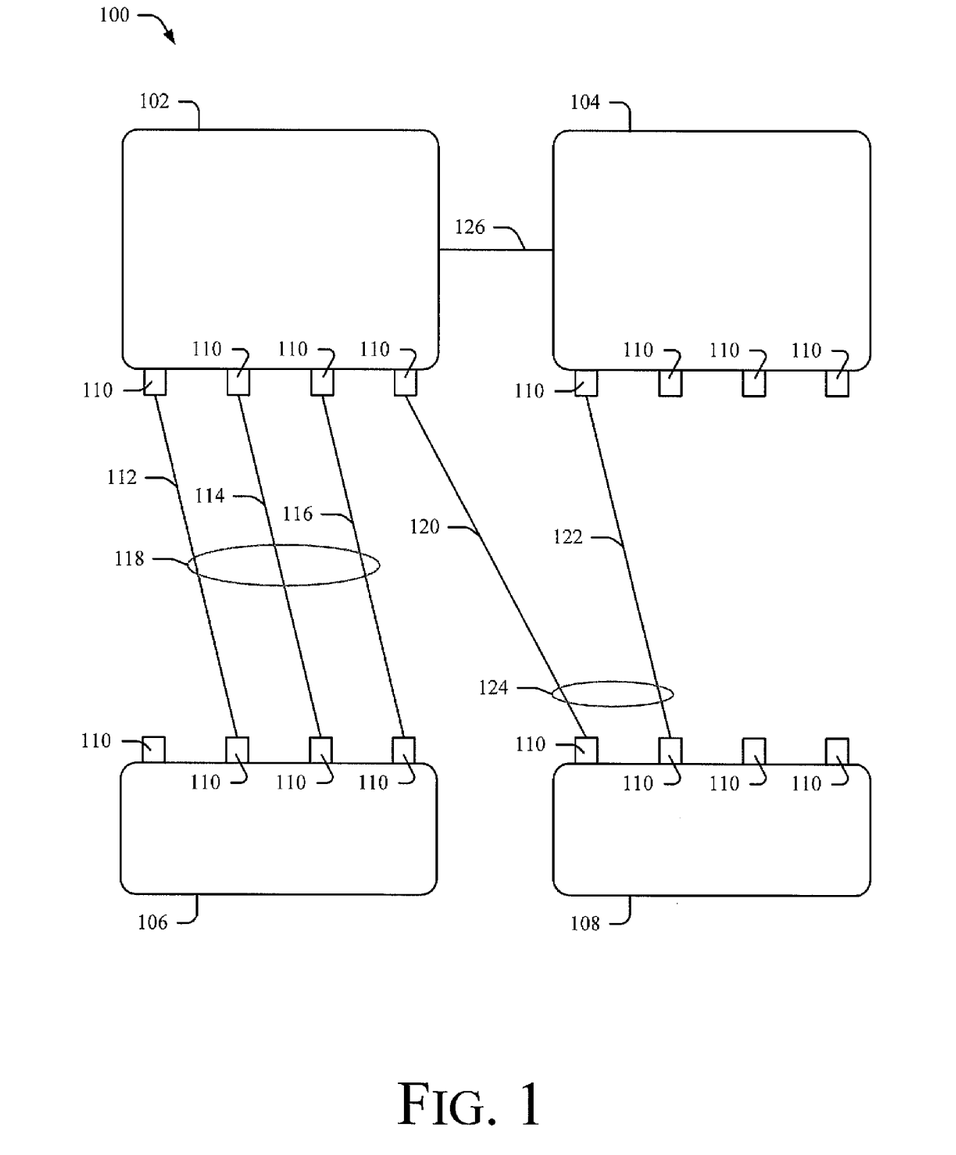
FIG. 1 illustrates an exemplary operating environment in which various embodiments of the tools may operate.

FIG. 1 illustrates one operating environment generally at 100 for enabling equipment to use its permitted data rate or physical maximum rate even if one or more of its links fails or it transmits more data on some links than others. The environment includes two pieces of local equipment 102, 104 and two pieces of remote equipment 106, 108. In the illustrated embodiment, each piece of local equipment and remote equipment is a switch having a plurality of ports 110.

In other embodiments, the local equipment and/or remote equipment may be a router. The terms router and switch as used herein both refer to a device capable of accepting a data packet on one port and egressing the data packet on another port based on an address, label, or other identifier.

Three physical links 112, 114, 116 connect the first local switch 102 to the first remote switch 106. Each physical link provides a communication path between the first local switch 102 and the first remote switch 106 and enables data packets to travel between the switches. Each physical link comprises a medium and a protocol. The physical link may comprise various media such as twisted-pair copper, single-mode fiber, multi-mode fiber, or a radio frequency.

The local switch and remote switch use at least one common protocol to communicate over the physical medium. For example, the switches may communicate using Ethernet data packets, Asynchronous Transfer Mode (ATM) cells, Time Division Multiplexing (TDM) messages, or the like. Additionally, each physical link may use a higher-level protocol such as Internet Protocol (IP), Transmission Control Protocol (TCP), or the like.

Each physical link has a physical maximum data rate at which it may convey data between the two switches. The physical maximum data rate is typically described in terms of the number of bits per second that may be conveyed by the physical link and the protocols operating on the link. For example, a particular combination of a twisted-pair copper physical medium and the Ethernet protocol may convey data at a maximum rate of 100 Mbps. Another combination of physical medium and protocols may operate at a different maximum rate.

In this embodiment, links 112, 114, and 116 comprise a first logical link 118. The first logical link may also be referred to as a group. Of course, a logical link can comprise more than three physical links in other embodiments. In this particular embodiment, the first logical link comprises an Ethernet link aggregation group as defined by the Institute of Electrical and Electronics Engineers (IEEE) 802.3ad standard. The first logical link is assigned a permitted data rate that is enforced by the first local switch 102. The local switch receives the permitted data rate from the service provider via a configuration file, a variable, a command, or the like. This logical link's permitted data rate is the highest aggregate data rate at which the first local switch will accept data packets from the three physical links of the first logical link. The permitted data rate is independent of the aggregate physical maximum data rates of the physical links because it can be configured to be less than, the same, or more than the aggregate physical maximum data rate.

The permitted data rate is also the highest rate at which the first local switch will accept data packets from any one of the three physical links individually. If only one of the physical links of the first logical link is active during a particular time period, the entire permitted data rate is available to that physical link.

For example, the permitted data rate for the first logical link may be 75 Mbps, and each of the three physical links in the first logical link may have a maximum data rate of 100 Mbps. If two of the physical links are not active, (for example, because the remote switch is not sending any data on those links) and one of the physical links is active, the local switch will accept data on the active physical link at a rate of up to 75 Mbps. Of course, the other two physical links of the first logical link will become active as soon as the remote switch sends data on those links.

If two physical links become active, the first local switch will accept data packets from both links. The local switch, however, will limit the combined rate of the data packets received on the two physical links to the permitted data rate.

In the above example, each port of the first remote switch may transmit data packets on the physical links at a rate less than or equal to the permitted data rate as long as the aggregate rate for data packets received by the first local switch on all physical links comprising the logical link is less than or equal to the permitted data rate. For example, with a permitted data rate of 75 Mbps, the first remote switch may transmit data packets on one physical link at a rate of 50 Mbps and transmit data packets on the other physical link at a rate of 25 Mbps.

The rate at which the first remote switch transmits data packets on the three physical links of the first logical link may change dynamically over time. For example, over one discrete period of time the first remote switch may transmit at rates of 10 Mbps, 30 Mbps, and 25 Mbps respectively on each of the three physical links comprising the first logical link.

During a later discrete period of time the first remote switch may transmit at rates of 40 Mbps, 25 Mbps, and 5 Mbps respectively on each of the three physical links of the first logical link. The first remote switch may transmit data packets on the three physical links in other combinations as well as long as the aggregate rate for the first logical link is less than or equal to 75 Mbps.

The local switch determines whether the permitted data rate will be violated before deciding whether to accept a data packet from the remote switch. If accepting the data packet will not violate the permitted data rate, the local switch accepts the packet. If accepting the data packet will violate the permitted data rate, the local switch drops the packet. The local switch communicates either the amount of the permitted data rate that has been consumed or the amount that remains unused to each port of the local switch that is part of the logical link. Each port uses this information in deciding whether to accept or drop a particular packet presented to the port by the remote switch.

Some conventional switches, however, may allocate an equal portion of a permitted data rate to each of the physical links comprising a logical link. For example, in such a conventional switch with a logical link comprising three physical links and a permitted data rate of 75 Mbps, a remote switch may be limited to sending data packets at a rate of 25 Mbps on each of the three physical links. This remote switch cannot exceed the allocated rate of 25 Mbps on a particular physical link even if the other two physical links comprising the logical link are idle.

In the above discussion, a logical link has been described as comprising one or more physical links. However, a logical link may alternatively comprise one or more data streams. A data stream may comprise substantially all of the data packets presented at a particular port of a local switch, in which case each port contains a single data stream. In other embodiments, a data stream may comprise a portion of the data packets presented at a particular port of a switch. A data stream is a set of data packets having a common identifier. The packets of a data stream may be marked with the identifier enabling data packets belonging to one data stream to be distinguished from data packets belonging to another data stream.

An identifier in a data packet such as a Virtual Local Area Network Identifier (VLAN ID), a MultiProtocol Label Switching (MPLS) label, a priority value, or the like may define the portion. For example, a single port may contain a plurality of data streams wherein each data stream is identified by a VLAN ID such that all data packets having the same VLAN ID belong to the same data stream. A switch may apply a permitted data rate to a logical link comprising one or more data streams in a manner similar to that described above for logical links comprising one or more physical links.

Each physical link may relay one or many data streams. Each of these data streams has a physical maximum data rate based on the physical link over which it is sent and any corresponding protocol. This physical maximum data rate may be as much as the link's physical maximum, such as when the data stream is using all of the possible data rate of the link on which it is relayed.

The environment 100 of FIG. 1 also illustrates a second logical link. A first physical link 120 connects one port of a second remote switch 108 to a port of the first local switch 102 and a second physical link 122 connects a second port of the second remote switch 108 to a port of the second local switch 104. The two links 120, 122 form a second logical link 124. This second logical link differs from the first logical link 118 in that in the second logical link the second remote switch 108 is connected to two different local switches 102, 104.

In this embodiment, the first and second local switches 102, 104 work together to apply a single permitted data rate to the second logical link. Both local switches are aware of the permitted data rate and each local switch shares information about the amount of the permitted data rate that has been consumed on that local switch during a particular time period with the other local switch.

For example, the second logical link may have a permitted data rate of 75 Mbps and the first local switch may be receiving data packets at a rate of 50 Mbps on link 120. The second local switch may be receiving data packets at a rate of 100 Mbps on line 122. In this example, the first local switch notifies the second local switch of the amount of the 75 Mbps being consumed by data packets relayed by link 120. Similarly, the second local switch notifies the first local switch of the amount of the 75 Mbps being consumed by data packets relayed by link 122.

In response, each local switch limits the rate at which it allows data packets from link 120 and link 122 to an aggregate of 75 Mbps. Of course, as described above, the data rates on links 120 and 122 may change dynamically over time. The two local switches share information about consumption of the permitted data rate periodically.

The local switches may share consumption information using a communication link 126. The communication link may be a communication link well known to those of skill in the art including a serial link, a bus, a parallel link, a wireless link, or the like.

The permitted data rate may represent a maximum average rate. In a data packet network, a switch must accept or reject an entire data packet rather than just a portion of a data packet. Consequently, the actual data rate might not be exactly the permitted data rate. However, on average, the maximum average rate will be substantially the permitted data rate.

Exemplary Embodiments for Consuming a Permitted Data Rate Using a Token Scheme

Figure 2:
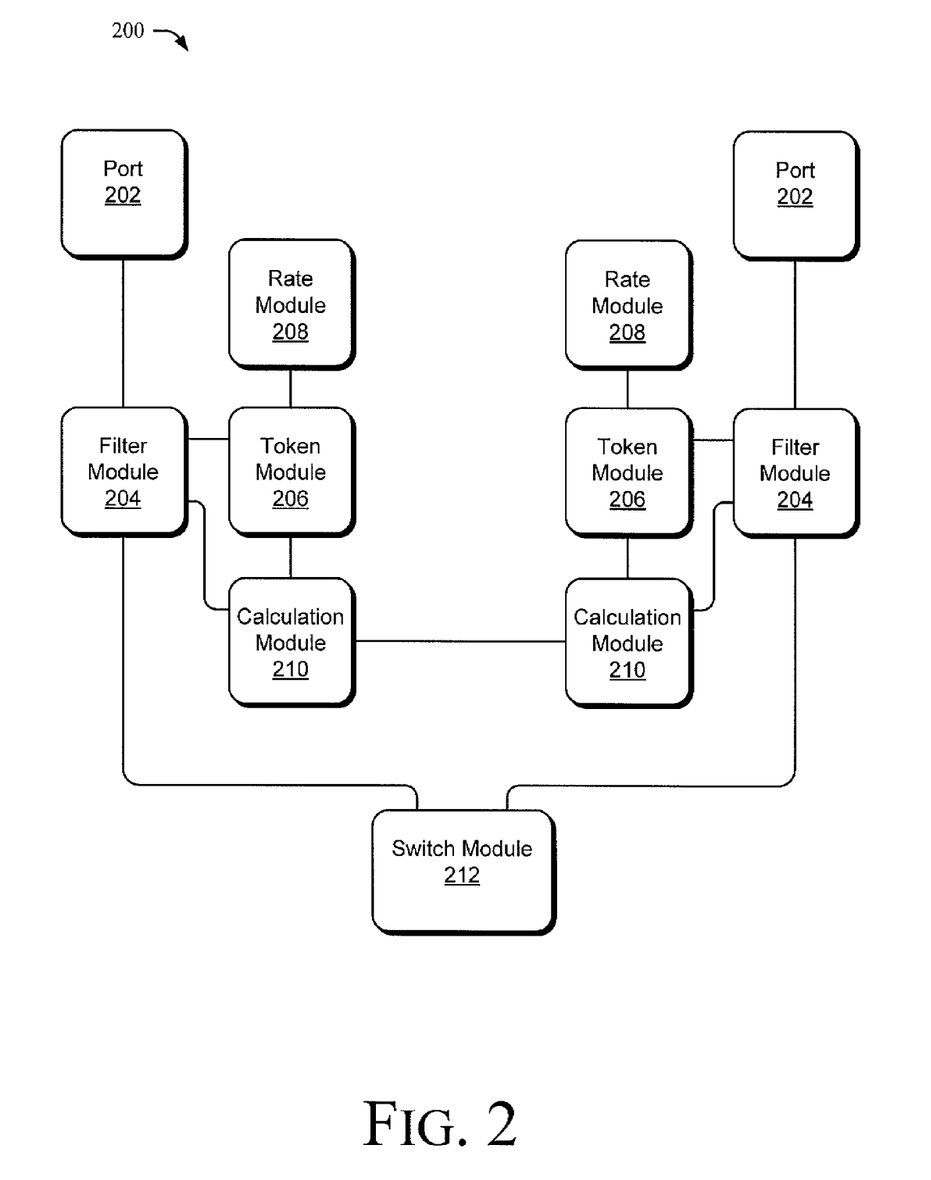
FIG. 2 illustrates an exemplary apparatus capable of permitting a plurality of data streams to consume a permitted data rate.
Figure 3:
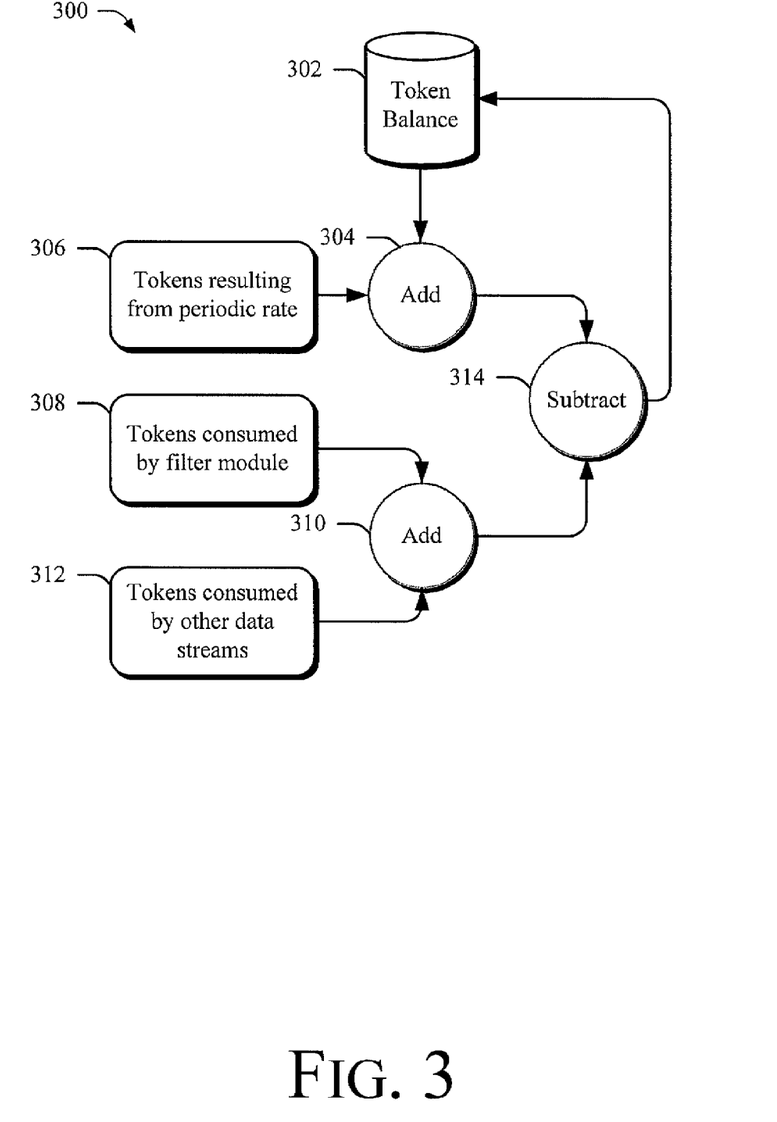
FIG. 3 illustrates an exemplary method of permitting a plurality of data streams to consume a permitted data rate.
Figure 4:
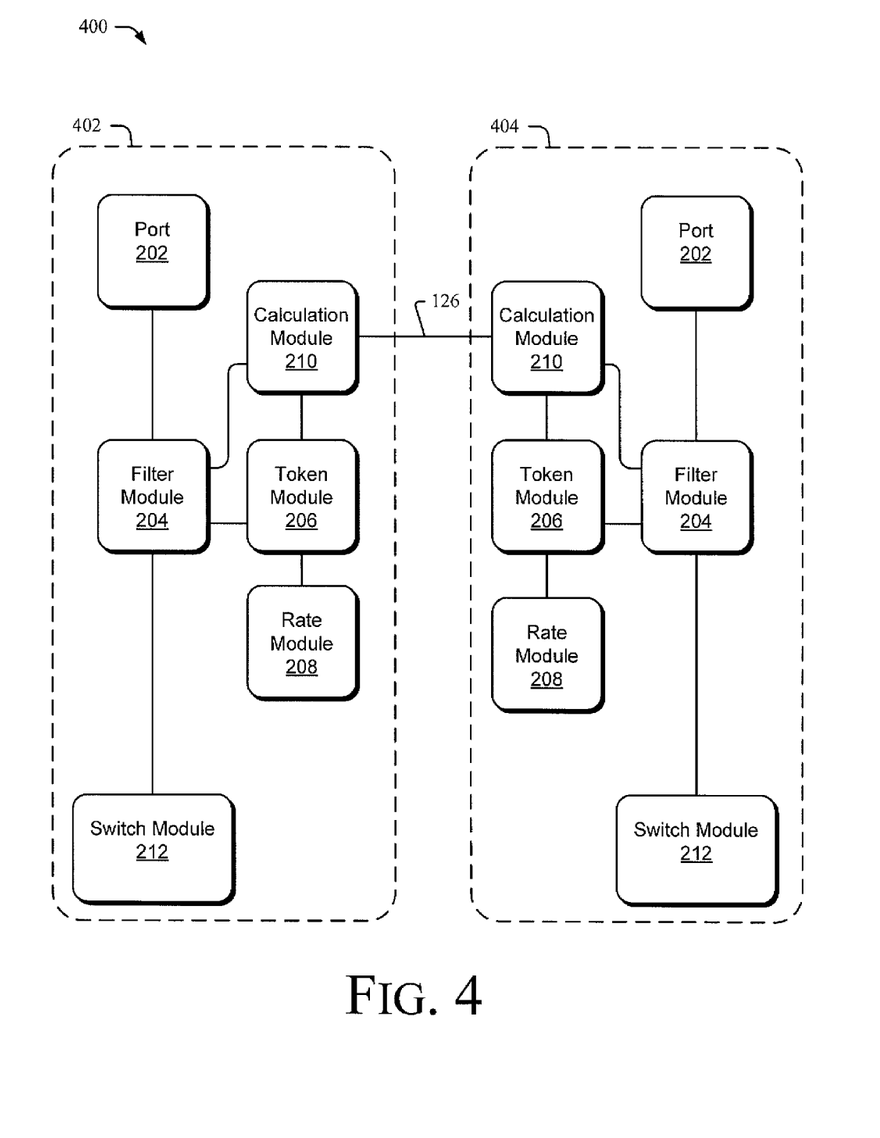
FIG. 4 illustrates an exemplary system capable of permitting a plurality of data streams to consume a permitted data rate.

FIGS. 2, 3, and 4 illustrate exemplary embodiments of the tools enabling consumption of a permitted data rate using a token scheme. The tools may act in other manners as well, some of which are described in the final section.

FIG. 2 illustrates an exemplary apparatus 200 capable of permitting a plurality of data streams to consume a permitted data rate. The apparatus 200 comprises at least one port 202, at least one filter module 204, at least one token module 206, at least one rate module 208, at least one calculation module 210, and at least one switch module 212. The apparatus 200 is one embodiment of a portion of the local switch 102 described above.

The port 202 receives a data stream from another device, such as a remote switch. The port relays data packets to the filter module. In the depicted embodiment, two ports are illustrated. These ports are both members of a logical link having two data streams. In the depicted embodiment, the two filter modules relay data packets to a single switch module. In an alternative embodiment, each filter module may relay data packets to a different switch module.

The filter module 204 determines whether to relay the data packets received from the port to the switch module 212 or to discard the data packets. If the rate at which the data packets ingress or egress the port exceeds a permitted data rate defined for the logical link, the filter module drops a portion of the packets of the data stream so that the resulting data stream relayed to the switch module does not exceed the permitted data rate.

In this embodiment, the filter module employs a token scheme to determine whether relaying a packet will exceed the permitted data rate of the logical link. According to this token scheme, the filter module may relay a data packet if there is a token available for each byte of the data packet. If not enough tokens exist for each byte of the data packet the entire data packet is dropped. The token module 206 accumulates tokens and maintains a token balance, which the filter module may access.

Before the filter module relays a data packet from the port to the switch module, the filter module checks the token balance. If there are sufficient tokens for the data packet, the filter module relays the data packet to the switch module and reports the number of tokens consumed to the token module so that the token module can debit the token balance to account for the tokens consumed in relaying the data packet. The filter module also reports the number of tokens consumed in relaying the data packet to the calculation module 210. If there are not sufficient tokens to cover each of the bytes of the data packet, the data packet is not relayed to the switch module.

The rate module 208 stores the permitted data rate for a logical link. The rate module may use one of a variety of ways to inform the token module of the permitted data rate. For example, the rate module may simply communicate the permitted data rate to the token module. In response, the token module periodically adds tokens to the token balance in proportion to the communicated permitted data rate. Alternatively, the rate module may send a periodic instruction to the token module to add one or more tokens to the token balance.

In this embodiment, the rate module sends the periodic instructions at a rate proportional to the permitted data rate.

The calculation module 210 receives reports from other calculation modules corresponding to each of the data streams that are part of the logical link. Each of the other calculation modules reports the number of tokens consumed by the filter module in relaying a data packet to the switch module. For a particular token module associated with a particular data stream, the calculation module adds up the total number of tokens spent by filter modules associated with other data streams and reports that number to the particular token module. The particular token module debits its token balance by the amount provided by the calculation module.

In this manner, each token balance maintained by each token module reflects the degree to which other data streams are consuming the permitted data rate. The token module prevents the particular data stream associated with the token module from exceeding the permitted data rate by adjusting the token balance to represent the data rate that is available for the associated data stream to consume without violating the permitted data rate.

The token balance changes frequently. The calculation module and token module may be capable of updating the token balance at a frequency having a period smaller than the period of the smallest data packet accepted by the local switch.

The calculation module calculates the total number of tokens consumed by each filter module and calculates a single new token balance to be used by the token module. The calculation module communicates the tokens spent by the filter module during this period to all other calculation modules in the logical group, which in turn update their own token balances.

The token module 206 maintains the token balance and provides the token balance to the filter module. The token module adds tokens to the token balance periodically in proportion to a permitted data rate. For example, if the logical link has a permitted data rate of 75 Mbps, the token module periodically adds a token to the token balance at a rate such that the number of tokens added per second is equivalent to a rate of 75 Mbps.

The switch module 212 is a conventional data packet switch with a plurality of ports, which is well known to those of skill in the art. The switch module receives a data packet from the filter module on a first port and egresses the data packet on a second port based on address information contained in the data packet. For simplicity, FIG. 2 illustrates the ingress port of the switch module but does not illustrate egress ports.

In one embodiment, the switch module comprises a single switch chip. In another embodiment, the switch module may comprise a plurality of switch chips. In this embodiment the switch chips comprising the switch module may be located on different cards or blades within a chassis.

The embodiment depicted in FIG. 2 may also be used to enforce a permitted rate as data packets egress a switch. Rather than making a decision before relaying data packets to the switch module, the filter module may receive a data stream from the switch module and determine whether the data stream is within the permitted data rate before allowing the data packets comprising the data stream to egress the port.

In this embodiment, the filter module operates in substantially the same manner described above except that the filter module receives data packets from the switch module and transmits the data packets to the port if there are sufficient tokens available to transmit the data packets. In this manner, enforcing the permitted data rate may be performed prior to data packets egressing the switch.

FIG. 3 illustrates an exemplary method 300 of permitting a plurality of data streams to consume a permitted data rate used by the token module 206. Note also that this exemplary method need not allocate a maximum rate to each of the data streams that is less than the permitted data rate, such as the permitted data rate divided by the number of data streams.

In this embodiment, the token module periodically updates a token balance 302. During a period, the token module determines the current token balance by reading a memory location, reading a register, reading a variable, or by using another method of reading a stored balance well known to those of skill in the art.

Next, the token module adds 304 tokens resulting from a periodic rate 306 to the token balance. The token module then determines the number of tokens consumed during the previous period by the particular filter module 308 associated with the token module. The filter module supplies the number of tokens consumed during the previous period. The token module adds 310 this number to the number of tokens consumed during the previous period by filter modules associated with other data streams 312 that are part of the logical link. The calculation module supplies the number of tokens consumed by other filter modules to the token module.

Next, the token module subtracts 314 the sum of the tokens consumed by the particular filter module and the tokens consumed by other filter modules from the sum of the token balance and the additional tokens resulting from the periodic rate. The result of the subtraction is a new token balance. The token module stores the new token balance. The filter module uses the new token balance during the next period in deciding whether to relay a received data packet to the switch module.

The token module may employ alternative methods of updating the token balance. For example, if the calculation module calculates and supplies a new token balance to the token module, as described above in relation to the calculation module, the token module stores the new token balance supplied by the calculation module.

Since each filter module associated with the logical link is able to consume the token balance during any particular period, the total number of tokens consumed by all the filter modules may exceed the token balance. In this situation, the resulting token balance will be negative. The filter module allows negative token balances. The effect of a negative token balance is that in the period following a period in which a negative token balance is stored, none of the filter modules associated with the logical link will relay data packets to the switch module. This behavior continues until the token balance is positive. Although the token balance may be negative during a particular period, on average, the aggregate data rate will be substantially the permitted data rate.

FIG. 4 illustrates an exemplary system 400 capable of permitting a plurality of data streams to consume a permitted data rate. The system comprises two switches 402, 404, each of the type described above in relation to FIG. 2. In this embodiment, two data streams are present, one at a port 202 on the first switch 402 and the other at a port 202 on the second switch 404.

Since the two data streams ingress or egress two different switches, the two switches share token consumption information to ensure that the permitted data rate is not exceeded. In the depicted embodiment, the calculation module in each switch receives information regarding the number of tokens consumed by each filter module and provides either a new token balance or the number of tokens consumed by the other filter module to each token module. As described above, a communication link 126 conveys this information between switches using a serial link, parallel link, bus, wireless link, or the like.

Other Embodiments of the Tools

The section above describes exemplary ways in which the tools enable consumption of a permitted data rate using a token scheme. The section below describes additional embodiments of the tools, including a process 500 shown in FIG. 5, which is illustrated as a series of blocks representing individual operations or acts preformed by the tools. Process 500 may be performed by a switch through computer-executable instructions on computer-readable media, hardware, a combination of both, or otherwise.

Figure 5:
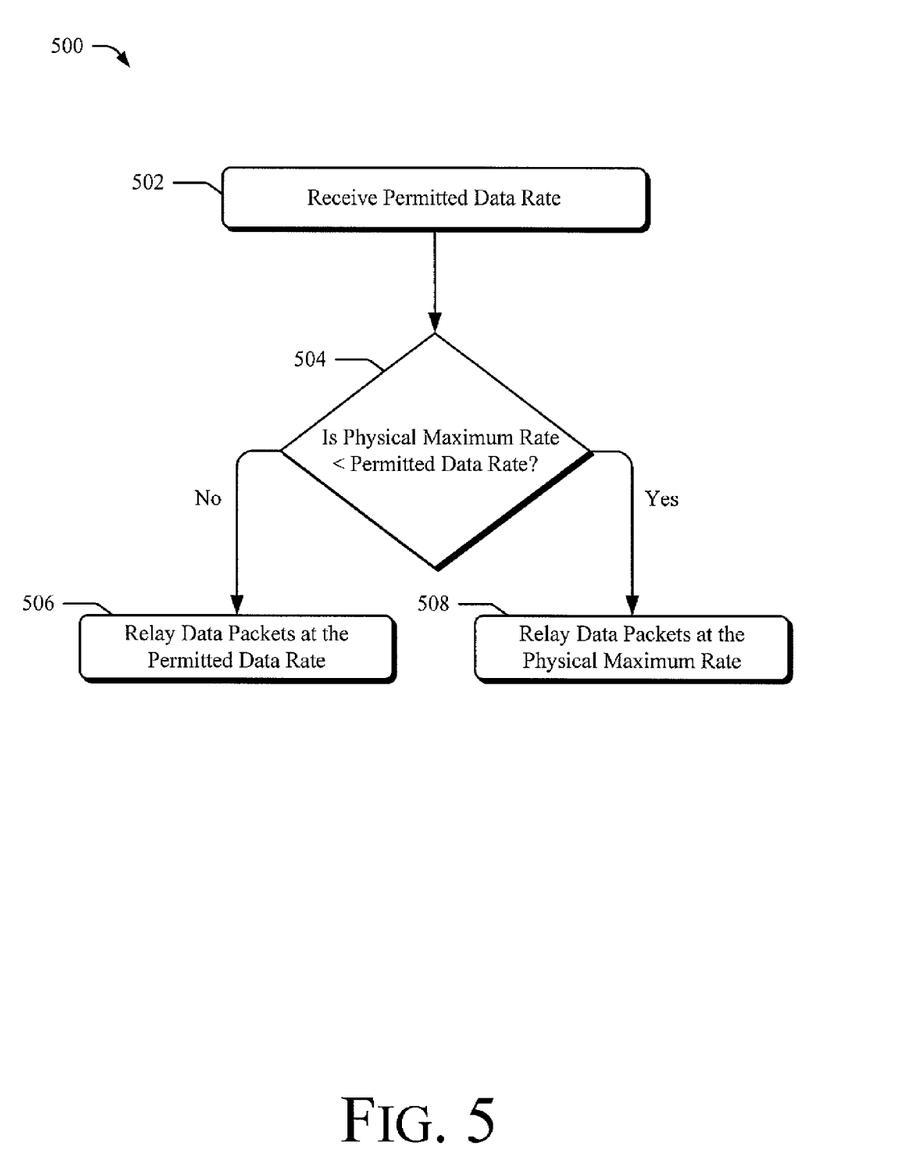
FIG. 5 is an exemplary process illustrating various embodiments and manners in which the tools may enable subscribers to use their permitted data rate or physical maximum rate even if one or more of their links fails or they transmit more data on some links than others.

At block 502 the tools receive a predetermined, permitted rate for packets received from a group of data streams. As described above in relation to FIG. 1, the group may include data streams comprising substantially all of the data packets received on a port or may include data streams comprising a portion of the data packets received on a port.

In addition, as illustrated by group 124 of FIG. 1, and described in relation to FIG. 4, the group may include data streams ingressing or egressing ports on two or more switches. In some embodiments, the group may be an Ethernet link aggregation group as defined by the IEEE 802.3ad standard mentioned above.

The group has a physical maximum rate that is an aggregate of a physical maximum rate for each of a set of physical links associated with the data streams of the group. The physical maximum rate for the group decreases if a physical link of the group fails.

Block 504 determines if the physical maximum rate is less than the permitted data rate. If it is, the tools proceed to block 506. If not, they proceed to block 508.

At block 506, if the physical maximum rate is greater than the permitted rate, the tools relay the packets received from the group at the predetermined, permitted rate. The tools may relay packets from any one of the data streams at an average rate substantially equal to the smaller of a permitted data rate and a physical maximum data rate for the physical port associated with the data stream. In this manner, a single data stream may consume the entire permitted rate, as illustrated in an example described above in relation to FIG. 1.

Alternatively, the tools may relay packets from two or more of the data streams of the group at an aggregate average rate substantially equal to the permitted rate. In this manner, two or more data streams may consume the permitted rate as illustrated in an example described above in relation to FIG. 1.

In relaying packets received from the group, the tools may discard packets from one or more of the data streams to prevent the aggregate average data rate for the group of data streams from exceeding the permitted data rate.

In discarding packets, the tools may employ the exemplary apparatus capable of permitting a plurality of data streams to consume a permitted data rate described above in relation to FIGS. 2 and 3. In using this exemplary apparatus, the tools may determine a portion of a permitted data rate consumed by a first data stream during a first time period. Next, the tools may debit the portion of the permitted data rate from a permitted data rate balance associated with a second data stream. Finally, the tools may remove a data packet from the second data stream during a second time period based on the debited permitted data rate balance.

The tools relay the packets from the group at the predetermined, permitted rate even if there is a decrease in the physical maximum rate due to a link failure unless the physical maximum rate is less than the predetermined, permitted rate.

At block 508, if the physical maximum rate is less than the permitted data rate, the tools may relay the packets from the group at the physical maximum rate.

CONCLUSION

The above-described tools enable equipment to use its permitted or physical maximum rate even if one of its data streams or physical links fails or it conveys more data on some links or streams than others. By so doing, the tools permit greater use of grouped data streams and/or physical links between local and remote switches within data networks. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method implemented at least in part by a computing device comprising:
    grouping a plurality of data streams, wherein each data stream ingresses a unique physical port;
    relaying data packets from any one of the data streams at an average rate based on the smaller of a permitted data rate for the group and a physical maximum data rate for the physical port associated with the data stream;
    relaying data packets from two or more of the data streams of the group at an aggregate average rate based on the permitted data rate for the group; and
    discarding data packets from one or more of the data streams to prevent the aggregate average data rate for the group of data streams from exceeding the permitted data rate for the group.

2. The method of claim 1, wherein the permitted data rate for the group is less than the smallest of the physical maximum data rates for the physical ports associated with the group of data streams.

3. The method of claim 1, wherein at least one of the data streams ingresses or egresses a first printed circuit board and at least one other of the data streams ingresses or egresses a second printed circuit board.

4. The method of claim 1, wherein the group comprises an Ethernet link aggregation group.

5. The method of claim 1, wherein the data packets are Ethernet packets.

6. The method of claim 1, further comprising:
    receiving data packets conveyed by the group, the group having a physical maximum rate that is an aggregate of the physical maximum rate for each of a set of physical port associated with the data streams of the group that decreases if a physical port of the group fails.

7. The method of claim 6, further comprising:
    relaying the packets conveyed by the group at the permitted data rate for the group regardless of a decrease in the physical maximum rate unless the decrease is sufficient to reduce the physical maximum rate below that of the permitted data rate.

8. The method of claim 7, wherein the decrease is sufficient to reduce the physical maximum rate below that of the permitted data rate and further comprising relaying the packets conveyed at the physical maximum rate immediately after the decrease.

9. The method of claim 7, wherein the permitted data rate is independent of the group's physical maximum rate.

10. The method of claim 7, wherein the permitted data rate is associated with a remote switch from which the packets are sent through the group.

11. The method of claim 7, wherein at least one of the data streams comprises data packets associated with a physical port.

12. The method of claim 7, wherein at least one of the data streams comprises data packets associated with a predetermined Virtual Local Area Network Identifier and a physical port.

13. A system comprising:
a plurality of unique physical ports conveying a plurality of data streams; and
a computing device configured to:
group the plurality of data streams;
relay data packets from any one of the data streams at an average rate based on the smaller of a permitted data rate for the group and a physical maximum data rate for the physical port associated with the data stream;
relay data packets from two or more of the data streams of the group at an aggregate average rate based on the permitted data rate for the group; and
discard data packets from one or more of the data streams to prevent the aggregate average data rate for the group of data streams from exceeding the permitted data rate for the group.

14. The system of claim 13, wherein the permitted data rate for the group is less than the smallest of the physical maximum data rates for the physical ports associated with the group of data streams.

15. The system of claim 13, wherein at least one of the data streams ingresses or egresses a first printed circuit board and at least one other of the data streams ingresses or egresses a second printed circuit board.

16. The system of claim 13, wherein the permitted data rate for the group is associated with a remote switch from which the data packets are sent through the group.

17. The system of claim 13, wherein at least one of the data streams comprises data packets associated with a predetermined Virtual Local Area Network Identifier and a physical link.

* * * * *